T. P. WALLACE.
PIPE CLEANER.
APPLICATION FILED DEC. 17, 1918.
1,317,187.
Patented Sept. 30, 1919.
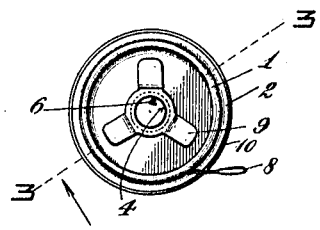
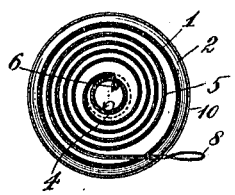
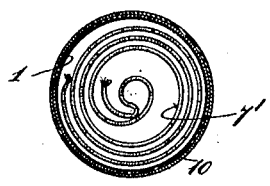
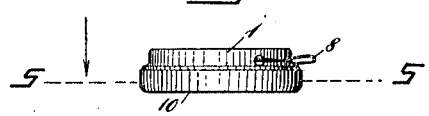
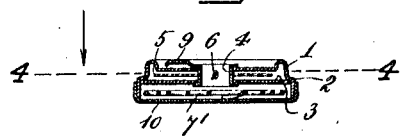
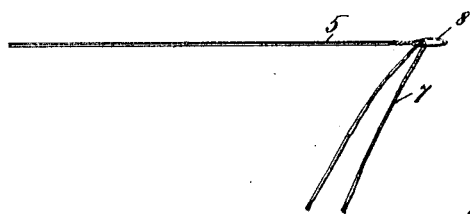
INVENTOR:
Thomas P. Wallace
By Geo. K. Woodworth
ATTORNEY

UNITED STATES PATENT OFFICE.

THOMAS P. WALLACE, OF CONCORD, NEW HAMPSHIRE.

PIPE-CLEANER.

1,317,187.  Specification of Letters Patent.  Patented Sept. 30, 1919.

Application filed December 17, 1918. Serial No 267,162.

*To all whom it may concern:*

Be it known that I, THOMAS P. WALLACE, a subject of the King of Breat Britain and Ireland, and a resident of Concord, in the county of Merrimack and State of New Hampshire, have invented a new and useful Improvement in Pipe-Cleaners, of which the following is a specification.

The object of the present invention is to provide a device of convenient size to be carried in the user's pocket for containing a reel or resilient wire and a supply of fibrous material, short lengths of which can be attached to the end of the wire for insertion into a pipe.

With this object in view, my invention comprises a reel rotatably mounted in a cylindrical casing, which preferably is divided into two compartments by a partition, a resilient wire located within one compartment, and having one end secured to said reel and the other extending through an aperture in the peripheral surface of said casing, and a removable cover which, with said partition, forms a compartment adapted to receive a supply of fibrous material, short lengths of which may be cut off as desired and attached to the outer end of the wire.

One embodiment of my invention is shown in the accompanying drawings, in which—

Figure 1 is a plan view of my improved pipe cleaner, Fig. 2 is a side view, Fig. 3 is a vertical section taken on the line 3—3 of Fig. 1, Fig. 4 is a horizontal section taken on the line 4—4 on Fig. 3, Fig. 5 is a similar section taken on the line 5—5 of Fig. 2, and Fig. 6 is a perspective view showing a portion of the resilient wire with a length of fibrous material attached to the end thereof.

In the particular drawings selected for more fully disclosing an illustrative embodiment of my invention, 1 represents a cylindrical casing provided with a peripheral flange 2, located approximately midway between its ends and arranged for receiving the partition 3 which extends across the casing and divides the same into two compartments, said partition being held in position in the manner hereinafter set forth.

Rotatably mounted in the casing is a reel 4 shown in the present instance as a stud having end flanges which abut the outer faces of the casing and the partition, said stud being adapted to have a fine resilient wire 5 wound thereon. One end of said wire, here shown as doubled and twisted on one end to form the loop 8, is secured to the stud in any suitable manner, such end being shown in the present instance as passing through the stud and knotted at 6, and the other end passes through an aperture in the peripheral surface of the casing, such outer end being arranged to receive a length of fibrous material 7, the latter in the present embodiment of my invention passing through said loop 8.

Means exterior of the casing must be provided for operating the reel, and in the present instance I have shown three lateral members 9 connected to, and preferably integral with, the outer flange of said stud, the face of the casing preferably being depressed so that said extensions will not protrude beyond the outer rim of the casing. To assemble the device, the reel is inserted through the central aperture in the outer face of the casing, the wire is wound thereon, the partition slipped over the projecting ends of the reel and the latter are then bent over to form flanges which abut the outer faces of the partition and hold the same in position against the flange 2 of the casing.

A removable cover 10 is provided and in the compartment formed between the same and the partition 3 a supply of fibrous material 7' such as cotton string may be carried.

To use the device, a suitable length of the resilient wire is drawn out of the casing and a short length of string threaded through the loop in the end of the wire, and the latter is then inserted into the pipe to be cleaned.

After the wire has been withdrawn from the pipe, the string is removed from the loop, the wire wiped off and then wound up on the reel which is rotated for this purpose by the members 9.

It will be noted that by dividing the casing into two compartments the wire is maintained out of contact with the supply of string, and any odor imparted thereto will be prevented from escaping.

It will be apparent that various modifications may be made in the particular device herein specifically described without departing from the scope of my invention as defined by the appended claims.

I claim:

1. A pipe cleaner comprising a cylindrical casing having a peripheral flange intermediate its ends, a partition extending across said casing and resting against said flange, a reel located in the compartment formed by said partition and one face of said casing, said reel having a flange abutting the outer face of said partition and holding the same against the peripheral flange of said casing, a resilient wire located in said compartment, one end of said wire being attached to said reel and the other end extending through an aperture in said casing, and means exterior to said casing for rotating said reel.

2. A pipe cleaner comprising a cylindrical casing having a peripheral flange intermediate its ends, a partition extending across said casing and resting against said flange, a stud passing through the face of said casing and said partition, said stud having flanges abutting the outer faces of said casing and partition and arranged to hold said partition against said peripheral flange of said casing, a resilient wire having one end attached to said stud and the other end extending through an aperture in said casing, and means connected to the outer flange of said stud for rotating the same.

3. A pipe cleaner comprising a casing, a partition extending across the same, a stud passing through one face of said casing and said partition, said stud having end flanges abutting said partition and said face of said casing, a resilient wire having one end attached to said stud and the other extending through an aperture in said casing, and means connected to the outer flange of said stud for rotating the same, the said face of said casing being depressed to accommodate said means.

In testimony whereof, I have hereunto subscribed my name this 14th day of Dec., 1918.

THOMAS P. WALLACE.

Copies of this patent may be obtained for five cents each, by addressing the "Commissioner of Patents, Washington, D. C."